(12) United States Patent
Zhang et al.

(10) Patent No.: US 11,385,661 B1
(45) Date of Patent: Jul. 12, 2022

(54) GAS PRESSURE REGULATING DEVICE

(71) Applicant: NINGBO WANAN CO., LTD, Ningbo (CN)

(72) Inventors: Feng Zhang, Ningbo (CN); Yunnan Wei, Ningbo (CN); Jinghui Fan, Ningbo (CN); Minxiao Dai, Ningbo (CN)

( * ) Notice: Subject to any disclaimer, the term of this patent is extended or adjusted under 35 U.S.C. 154(b) by 0 days.

(21) Appl. No.: 17/349,761

(22) Filed: Jun. 16, 2021

(30) Foreign Application Priority Data

Apr. 20, 2021 (CN) .......................... 202110421591.X

(51) Int. Cl.
*F16K 31/12* (2006.01)
*G05D 16/04* (2006.01)
*G05D 16/06* (2006.01)

(52) U.S. Cl.
CPC ..... *G05D 16/0402* (2019.01); *G05D 16/0694* (2013.01); *Y10T 137/7795* (2015.04)

(58) Field of Classification Search
CPC ......... Y10T 137/7795; Y10T 137/7808; Y10T 137/7834; Y10T 137/7822; Y10T 137/783; Y10T 137/7831
See application file for complete search history.

(56) References Cited

U.S. PATENT DOCUMENTS

| 444,082 A | * | 1/1891 | Abbe | ................... G05D 16/103 137/505.25 |
| 3,900,045 A | * | 8/1975 | Murrell | ............. G05D 16/0686 137/505.38 |
| 4,630,641 A | * | 12/1986 | Lacour | ............... G05D 16/0686 137/505.38 |
| 4,821,767 A | * | 4/1989 | Jackson | ................. A62B 9/027 128/204.26 |

(Continued)

FOREIGN PATENT DOCUMENTS

CN          10587894      *  3/2016

*Primary Examiner* — Robert K Arundale
(74) *Attorney, Agent, or Firm* — W&K IP

(57) ABSTRACT

A gas pressure regulating device is provided which comprises a housing, in which a first mounting cavity for installing a level-1 depressurization mechanism and a second mounting cavity for installing a level-2 depressurization mechanism are provided in sequence along the air intake direction; the level-1 depressurization mechanism comprises a sliding sleeve, and a mounting tubing which is communicated with the gas inlet is formed inside the first mounting cavity, and the sliding sleeve is slidably assembled between an outer wall of the mounting tubing and an inner wall of the first mounting cavity; the other end of the sliding sleeve is provided with a gas discharge orifice and a sealing gasket, and the gas inlet connector is in communication with the first mounting cavity through the gas discharge orifice; the sliding sleeve slides along the axial direction to adjust the openness of the gas outlet to realize the level-1 depressur- (Continued)

ization. The gas pressure regulating device provided comprising two levels of depressurization mechanisms, which is simple in structure and fewer in parts. Further, the device is capable of effectively reducing the risk of occurrence of dangerous accidents such as product leakage due to failure of parts, thereby effectively guaranteeing stability and accuracy of pressure regulation performance.

11 Claims, 13 Drawing Sheets

(56) References Cited

U.S. PATENT DOCUMENTS

| | | | |
|---|---|---|---|
| 8,087,428 B1* | 1/2012 | Beswick | F16K 17/085 |
| | | | 137/505.12 |
| 2006/0151029 A1* | 7/2006 | Olds | G05D 16/0402 |
| | | | 137/505 |
| 2007/0209703 A1* | 9/2007 | Neumann | G05D 16/106 |
| | | | 137/102 |
| 2012/0006429 A1* | 1/2012 | Chen | F16K 17/00 |
| | | | 137/535 |
| 2020/0340599 A1* | 10/2020 | Tsai | F16K 47/04 |

\* cited by examiner

GAS PRESSURE REGULATING DEVICE

CROSS-REFERENCE TO RELATED APPLICATIONS

This application claims priority to Chinese Patent Application No. 202110421591.X with a filing date of Apr. 20, 2021. The content of the aforementioned application, including any intervening amendments thereto, are incorporated herein by reference.

TECHNICAL FIELD

The present invention relates to the field of gas pressure regulations, and in particular to a gas pressure regulating device.

BACKGROUND

Gas pressure regulator (also known as gas pressure regulating valve) is a straight-rod type or lever-type device which regulates pressure by pressure difference feedback control. Gas in a gas cylinder is liquefied at a high-pressure and thus must be depressurized before being introduced into a gas stove for combustion. The working principle is as follows: a high-pressure medium is injected into a larger cavity for depressurization through an aperture, and the depressurization is actually realized by interception. One of two sides of a diaphragm or piston is an outlet cavity and the other receives a pressure applied by human. Further, a valve stein controlling the size of the aperture is connected with the diaphragm (piston). In this way, once under a constant pressure, a pressure of the outlet cavity will be always equal to the constant pressure. The constant pressure may be supplied by a spring or gas source or hydraulic source.

The gas pressure regulator functions to depressurize high-pressure gas in a gas cylinder into a low-pressure gas suitable for a gas stove. The pressure in a gas cylinder will gradually decrease along with consumption of gas. Taking American standard as an example, it states that a gas pressure regulator must meet the followings: the input pressure of gas cylinder is in the range of 25-250 PSI and the final outlet pressure is in the range of 2.4-3.0 kPa. In order to satisfy product requirements, large-power gas pressure regulators usually adopt a dual-cavity structure, that is, the gas is depressurized twice from input to output for use. FIG. 1 shows a structure of an existing pressure regulator. In the existing structure, two levels of depressurization mechanisms are of diaphragm structure, and regulation mechanisms 110 in linkage with a diaphragm 100 are all lever mechanisms comprising various types of parts.

Therefore, the existing pressure regulators have the following disadvantages.

1. The existing product is large in volume and high in raw material costs.
2. Due to complexity of gas circuit of housing of the existing product, more manufacturing procedures with high requirements have to be adopted which adversely affects the control of product quality.
3. The existing product has many parts, and their purchase cost and assembly cost are both high.
4. The existing product has more possible leakage points which bring higher gas leakage possibility. Especially, a high-pressure diaphragm (rubber) of a first-level pressure regulation structure bears a relatively high-pressure, and is large in area and easy to break. Further, there is a high risk that gas leaks from a breathing hole of an upper cover body.
5. In the existing products, it is required to fixedly rivet the high-pressure diaphragm between a housing and an upper cover, resulting in a possibility of leakage risk.

SUMMARY

The present invention aims to solve one of technical problems in related art at least to some extent: provided is a gas pressure regulating device comprising two levels of depressurization mechanisms, which is simple in structure and fewer in parts. Further, the device is capable of effectively reducing the risk of occurrence of dangerous accidents such as product leakage due to failure of parts, thereby effectively guaranteeing stability and accuracy of pressure regulation performance.

For this purpose, the present invention adopts the following technical solution: provided is a gas pressure regulating device comprising a housing. A gas inlet and a gas outlet are disposed on the housing respectively, a first mounting cavity in communication with the gas inlet is disposed at an end of the housing and a level-1 depressurization mechanism is disposed in the first mounting cavity; a second mounting cavity in communication with the gas outlet is disposed at the other end of the housing, the first mounting cavity is in communication with the second mounting cavity through a valve port, and a level-2 depressurization mechanism is disposed in the second mounting cavity to control the openness of a valve port.

The level-1 depressurization mechanism comprises a sliding sleeve. A gas inlet connector is disposed at the gas inlet end of the housing, an end of the gas inlet connector extends into the first mounting cavity to form a mounting tubing, and the sliding sleeve is slidably assembled between an outer wall of the mounting tubing and an inner wall of the first mounting cavity; an end of the sliding sleeve is slidably sleeved around the mounting tube, and a driving component for driving the sliding sleeve to slide toward the gas outlet is disposed in the first mounting cavity; the other end of the sliding sleeve is provided with a gas discharge orifice and a sealing gasket, and the gas inlet connector is in communication with the first mounting cavity through the gas discharge orifice; when the driving component drives the sliding sleeve to slide to a set position toward the gas outlet, the gas discharge orifice has the largest openness; after a pressure inside the first mounting cavity increases, the sliding sleeve slides toward the gas inlet connector, and the gas discharge orifice has a smaller openness, and when the sliding sleeve moves toward the gas inlet connector until the sealing gasket is pressed on an end face of the gas inlet connector, the gas discharge orifice is closed.

The present invention has the following advantages compared to the prior art.

1. One sliding sleeve structure is disposed in the first mounting cavity of the housing, the gas inlet connector is connected at an end of the housing, and the sliding sleeve is slidably fitted in a gap between the gas inlet connector and the inner sidewall of the housing to guarantee axial stable slide. By sliding the sliding sleeve axially, the openness of the gas discharge orifice can be adjusted. This sliding sleeve type pressure regulating mechanism replaces the existing lever type structure, reducing the number of product parts and assembling procedures of the parts. Therefore, the costs are effectively reduced and the production efficiency is improved.

2. Due to the smaller number of product parts and the lower safety risk of part defects and assembling error, the safety performance and pressure regulation stability of the product can be effectively improved.

3. With the disposal of the sliding sleeve structure, the entire structure is more compact, smaller in volume, and lower in consumption of raw materials. Further, the structure can improve the production efficiency and lower the production costs.

As an improvement, the driving component is a first pressure regulation spring. Both ends of the first pressure regulation spring are connected with the gas inlet connector and the sliding sleeve respectively. A sealing ring is disposed between an outer wall of the mounting tubing and an inner wall of the sliding sleeve and between an outer wall of the sliding sleeve and an inner wall of the mounting cavity respectively. In this structure, the first pressure regulation spring is adopted as the driving component for driving the sliding sleeve to move. The driving component is simple in structure and stable in drive and can enable the sliding sleeve to always have a resetting trend of sliding toward the gas outlet.

As a further improvement, a limiting step is convexly disposed at an inner sidewall of the pressure regulation cavity, and a limiting portion is disposed at an end of the sliding sleeve close to the gas outlet. When the gas discharge orifice has the largest openness, the limiting portion and the limiting step are abutted against each other. This structure is mainly used to limit a sliding stroke of the sliding sleeve so as to prevent the sliding sleeve from disengaging from the mounting tubing under the elastic action of the pressure regulation spring.

As a further improvement, an annular boss for sleeving the first pressure regulation spring is disposed at an outer sidewall of the mounting tubing. When an end of the first pressure regulation spring is sleeved on the annular boss, the other end of the first pressure regulation spring is held against a radial middle position of an annular end face of the sliding sleeve. This improved structure increases the stability of the first pressure regulation spring and also makes the first pressure regulation spring have a stable driving force for the sliding sleeve, thus ensuring more stable axial slide of the sliding sleeve.

As a further improvement, a cross section of the sealing gasket is shaped like "T", a mounting hole is disposed at a sidewall of the end of the sliding sleeve close to the gas outlet, one end of the sealing gasket is parallel to an gas outlet end face of the gas inlet connector, and the other end of the sealing gasket is cooperatively inserted into the mounting hole. This improved structure helps the sealing gasket to be more stably mounted. When in a valve closing state, it is guaranteed that the sealing gasket has stable sealing for the port of the mounting tubing, avoiding occurrence of leakage.

As a further improvement, the level-2 depressurization mechanism comprises a diaphragm assembly, a first supporting point, a second supporting point and a second pressure regulation spring. The first supporting point is disposed at a position that is on a lower end of the second mounting cavity and close to the valve port, and the second supporting point is disposed at a position that is on an upper end of the second mounting cavity and opposite to the first supporting point; one end of the diaphragm assembly passes through a passage between the first supporting point and the second supporting point to connect at a sidewall of one end of the second mounting cavity, and the other end of the diaphragm assembly is connected to a sidewall of the other end of the second mounting cavity; the end of the diaphragm assembly close to the valve port may rotate around the first supporting point or the second supporting point to realize the openness adjustment to the valve port, and the pressure regulation spring is disposed between the end of the diaphragm assembly away from the valve port and the upper end face of the second mounting cavity.

As a further improvement, a mounting step is disposed at an end of the lower end of the second mounting cavity close to the gas inlet and the valve port is disposed convexly at one end of the mounting step close to the gas inlet, and the first supporting point is convexly disposed at the other end of the mounting step. In this improved structure, a corresponding mounting step is disposed in a lower housing, so that the valve port and the first supporting point can be processed more conveniently, ensuring more flexible rotation of the diaphragm assembly and more stable pressure regulation.

As a further improvement, the first supporting point and the second supporting point are staggeredly disposed along a gas incoming direction, and the second supporting point is located between the valve port and the first supporting point along the gas incoming direction. In this improved structure, the first supporting point and the second supporting point are staggeredly designed such that the diaphragm assembly is capable of rotating upward or downward in an optimal state.

As a further improvement, the diaphragm assembly comprises a rubber diaphragm and a diaphragm cushion. The diaphragm cushion is covered on the top of the rubber diaphragm; an area of the diaphragm cushion is smaller than an area of the rubber diaphragm, and a circumferential outer edge of the rubber diaphragm is connected to the sidewall of the second mounting cavity. In this structure, the rubber diaphragm is mainly used to realize pressure transfer between upper and lower regions of the pressure regulation cavity as well as a pressure balancing effect, and the diaphragm cushion is used to support the rubber diaphragm to help the entire diaphragm assembly to rotate around a corresponding supporting point.

As a further improvement, a limiting boss is convexly disposed at a lower surface of an end of the diaphragm cushion close to the gas outlet and a limiting groove mated with the limiting boss is disposed on the rubber diaphragm. At least one locating assembly is disposed between the rubber diaphragm and the diaphragm cushion. This improved structure makes the rubber diaphragm and the diaphragm cushion more structurally stable after they are assembled, and enables the entire diaphragm assembly to rotate around a corresponding supporting point more stably and more flexibly.

As a further improvement, the locating assembly comprises a locating column integrally formed on the rubber diaphragm, and a locating hole mated with the locating column is disposed on the diaphragm cushion. In this improved structure, the locating structure is simple in structure, stable in locating, easy to process and lower in costs.

As a further improvement, the circumferential outer edge of a side of the diaphragm cushion away from the rubber diaphragm is folded up to form a retaining rim and a reinforcing protrusion rib is disposed inside the retaining rim on the diaphragm cushion. In this structure, the retaining rim and the reinforcing protrusion rib are used to effectively improve the structural strength of the diaphragm cushion, thereby ensuring the entire diaphragm assembly can rotate around a corresponding supporting point stably.

As a further improvement, a first locating groove is formed by recessing a side of the limiting boss away from the rubber diaphragm, a second locating groove corresponding to the first locating groove is disposed on the upper end face of the second mounting cavity, and both ends of the second pressure regulation spring are fitted into the first locating groove and the second locating grove respectively. This improved structure enables the elastic resetting piece to be mounted and located more stably and reliably, thus ensuring more smooth rotation of the diaphragm assembly.

BRIEF DESCRIPTIONS OF THE DRAWINGS

Numerals of the drawings are described below:
100—diaphragm, 110—regulation mechanism, 101, 001—gas inlet, 002—gas outlet, 1—housing, 1.1—upper housing, 1.2—lower housing, 2—first mounting cavity, 2.1—limiting step, 3—second mounting cavity, 4—valve port, 5—gas inlet connector, 6—mounting tubing, 6.1—annular boss, 6.2—sloping surface, 6.3—second sealing ring groove, 7—sliding sleeve, 7.1—limiting portion, 7.2—mounting hole, 7.3—first sealing ring groove, 8—gas discharge orifice, 9—sealing gasket, 10—first pressure regulation spring, 11—sealing ring, 12—first supporting point, 13—second supporting point, 14—second pressure regulation spring, 15—mounting step, 16—rubber diaphragm, 16.1—limiting groove, 16.2—locating column, 17—diaphragm cushion, 17.1—limiting boss, 17.2—locating hole, 17.3—retaining rim, 17.4—reinforcing protrusion rib, 18—first locating groove, and 19—second locating groove.

DETAILED DESCRIPTIONS OF EMBODIMENTS

The present invention will be further described in combination with the accompanying drawings and the specific embodiments.

In the descriptions of the present invention, it is understood that the orientations or positional relationships indicated by the terms such as "outer wall", "inner wall" and "outer end face" are based on the orientations or positional relationships indicated by the accompanying drawings and are used only for ease of descriptions and simplification of descriptions and does not indicate or imply that the indicated devices or elements must have a particular orientation, or be constructed or operated in a particular orientation. Therefore, such terms shall not be understood as limiting of the present invention.

In the present invention, unless otherwise clearly stated or defined, the term "connection" shall be understood in a broad sense, for example, may be fixed connection, or detachable connection, or integral connection; or may be mechanical connection, or electrical connection; or direct connection or indirect connection through an intermediate medium, or may be internal communication between two elements. Those skilled in the art may understand the specific meanings of the above term in the present invention according to actual situations.

Figure 1:
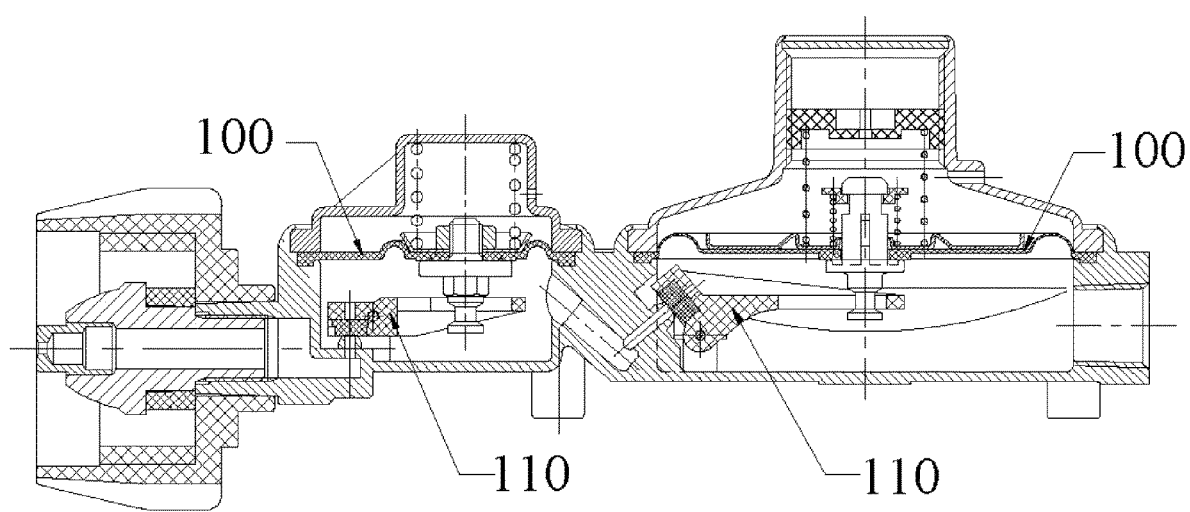
FIG. 1 is a structure of a gas pressure regulator in the prior art.
Figure 2:
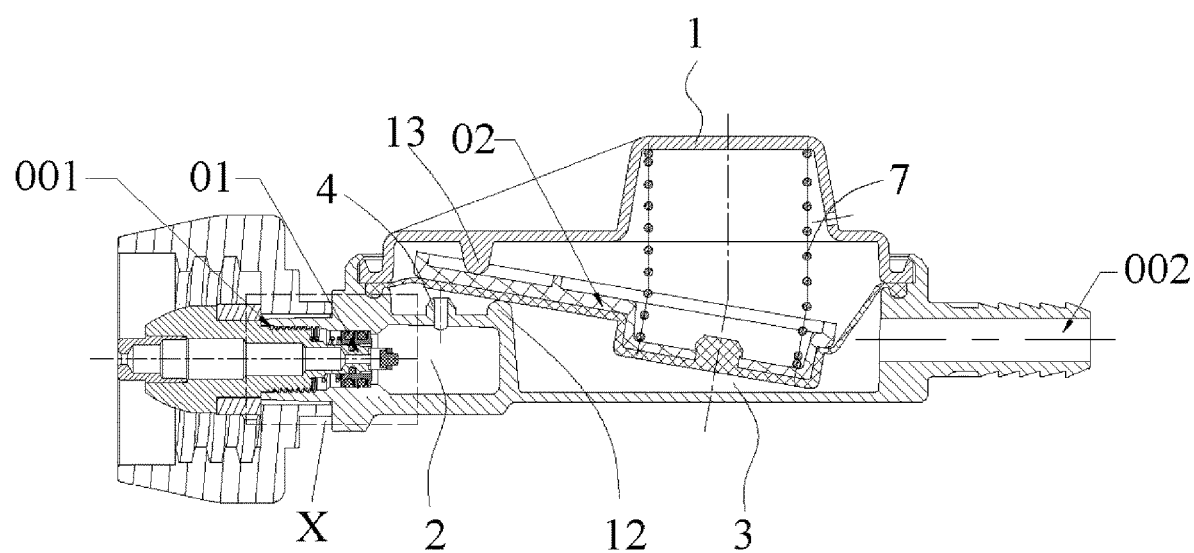
FIG. 2 is a semi-sectional structural diagram of a gas pressure regulating device according to the present invention.
Figure 3:
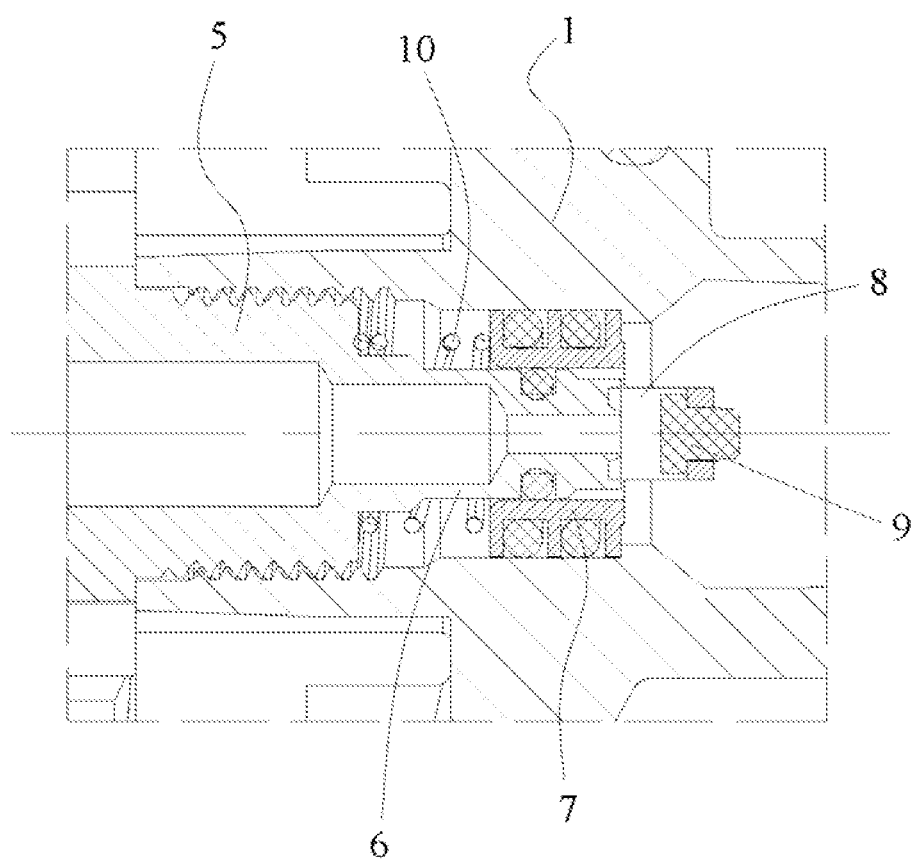
FIG. 3 is an enlarged structural view of the X position in FIG. 2.

As shown in FIGS. 2 and 3, the present invention provides a gas pressure regulating device comprising a housing 1. A gas inlet 001 and a gas outlet 002 are disposed respectively on the housing 1. Specifically, the housing 1 comprises an upper housing 1.1 and a lower housing 1.2, where the gas inlet 001 and the gas outlet 002 are disposed at both ends of the lower housing 1.2. Further, a first mounting cavity 2 in communication with the gas inlet 001 is disposed at an end of the lower housing 1.2, and a level-1 depressurization mechanism 01 is disposed in the first mounting cavity 2; a second mounting cavity 3 in communication with the gas outlet 002 is disposed at the other end of the lower housing 1.2, the first mounting cavity 2 is in communication with the second mounting cavity 3 through a valve port 4, and a level-2 depressurization mechanism is disposed in the second mounting cavity 3 to control an openness of the valve port 4.

As shown in FIG. 3, the level-1 depressurization mechanism 01 comprises a sliding sleeve 7, and a gas inlet connector 5 is connected at the gas inlet end of the housing 1. In this embodiment, the gas inlet connector 3 and the housing 1 are directly connected by threaded connection, making the structure simple and connection convenient. Further, in a case of threaded mating connection, a thread sealant may be applied to further ensure sturdiness and sealing of the connection.

Figure 4:
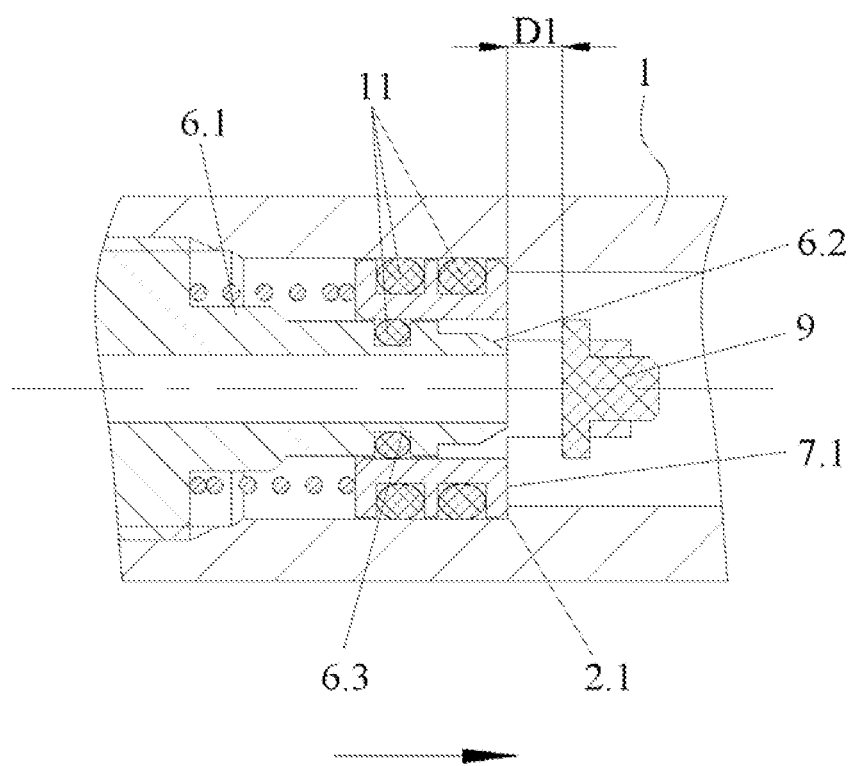
FIG. 4 is a partial sectional diagram of a level-1 depressurization mechanism according to the present invention (valve port is in a fully opened state).
Figure 7:
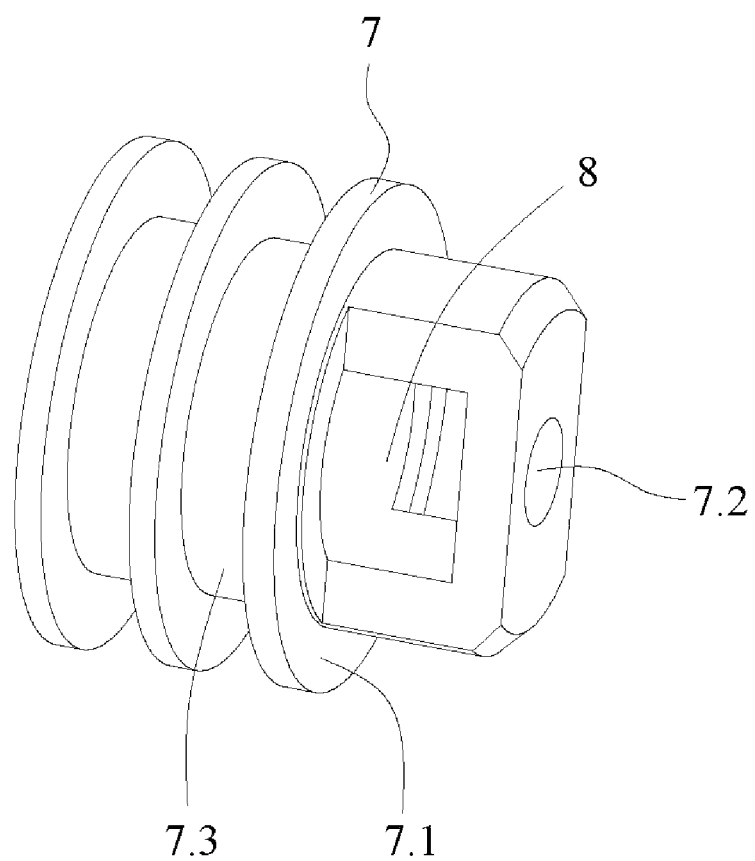
FIG. 7 is a structural schematic diagram of a sliding sleeve according to the present invention.

An end of the gas inlet connector 5 extends into the first mounting cavity 2 to form a section of mounting tubing 6. Specifically, an inner hole of the mounting tubing 6 is in communication with an inner hole of the gas inlet connector 5. The sliding sleeve 7 is slidably assembled between an outer wall of the mounting tubing 6 and an inner wall of the first mounting cavity 2. Specifically, an end of the sliding sleeve 7 is axially and slidably sleeved around the mounting tubing 6, and a driving component for driving the sliding sleeve 7 to slide toward the gas outlet 002 is disposed in the first mounting cavity 2. In this embodiment, the driving component is a first pressure regulation spring 10, both ends of which are connected with the gas inlet connector 5 and the sliding sleeve 7 respectively. A sealing ring 11 is disposed between an outer wall of the mounting tubing 6 and an inner wall of the sliding sleeve 7 and between an outer wall of the sliding sleeve 7 and an inner wall of the first mounting cavity 2 respectively. Specifically, as shown in FIGS. 3, 4 and 7, two first sealing ring grooves 7.3 spaced apart along an axial direction are disposed on the outer sidewall of the sliding sleeve 7, and the sealing ring 11 is mounted in each of the two first sealing ring grooves 7.3. Correspondingly, a second sealing ring groove 6.3 is disposed on an outer sidewall of the mounting tubing 6. The sealing ring 11 is mounted in the second sealing ring groove 6.3. In this way, when the sliding sleeve 7 slides axially, the smoothness of slide and the relative sealing of two cavities can be guaranteed, which further increases the accuracy of the pressure regulation of the pressure regulation spring 10 for no external air pressure enters a rated pressure regulation cavity.

With such a disposal, the sliding sleeve 7 divides the first mounting cavity 2 into two cavities. The cavity away from the gas outlet 002 is a rated pressure regulation cavity in which pressure may be predetermined. The first pressure regulation spring 10 is mounted in this cavity. When a pressure in the cavity close to the gas outlet 002 changes, the sliding sleeve 7 will slide axially so as to keep the two cavities in balanced state. In other words, the size of the final pressure at the output end of the pressure regulation mechanism is related to the rated pressure regulation cavity in this structure because the sliding sleeve 7 tends to be stable, that is, the pressures of the two cavities divided by the sliding sleeve 7 tend to be balanced when the gas outlet 002 outputs gas at a stable pressure. In another embodiment, the driving component may also be an elastic plate or a rubber corrugated pipe as long as it can realize elastic driving for the sliding sleeve 7.

A gas discharge orifice 8 and a sealing gasket 9 are disposed at the other end of the sliding sleeve 7 (an end close to the gas outlet 002), and the gas inlet connector 5 is in communication with the first mounting cavity 2 through the gas discharge orifice 8. In this structure, when the driving component drives the sliding sleeve 7 to slide to a set position toward the gas outlet 002, the gas discharge orifice 8 has the largest openness; after a pressure inside the first mounting cavity 2 increases, the sliding sleeve 7 slides toward the gas inlet connector 5, and the gas discharge orifice 8 has a smaller openness, and when the sliding sleeve 7 moves toward the gas inlet connector 5 until the sealing gasket 9 is pressed on an end face of the gas inlet connector 5, the gas discharge orifice 8 is closed.

Specifically, in this structure, the sliding sleeve 7 comprises a cylindrical portion with two ends of different diameters. The portion with a larger diameter is sleeved around the mounting tubing 6, and two outlet gas through holes, i.e. gas discharge orifices 8, are disposed symmetrically at a sidewall of the portion with a smaller diameter to enable the mounting tubing 6 to be in internal communication with the first mounting cavity 2 through the gas discharge orifice 8. Further, the sealing gasket 9 is mounted in the inner hole of the portion with a smaller diameter. As shown in FIGS. 2, 3 and 7, specifically, a cross section of the sealing gasket 9 is shaped like "T", a mounting hole 7.2 is disposed at the end of the sliding sleeve 7 close to the gas outlet 002, one end of the sealing gasket 9 is parallel to a gas outlet end face of the gas inlet connector 5, and the other end of the sealing gasket 9 is inserted into the mounting hole 7.2. More specifically, in this structure, a maximum outer diameter of the sealing gasket 9 is smaller than a hole diameter of the larger-diameter portion of the sliding sleeve 7, In this case, when the sealing gasket 9 is mounted, the entire sealing gasket 9 can be directly inserted from the inner hole of the larger-diameter end of the sliding sleeve 7 until a small end of the sealing gasket 9 is inserted into the mounting hole 7.2, thus ensuring the stability of the connection of sealing gasket 9 and the sliding sleeve 7. Further, a large end of the sealing gasket 9 is parallel to a groove side wall at the end of the mounting tubing 6 close to the gas outlet 002. Thus, in a valve closing state, the sealing gasket 9 can seal up the side wall of the mounting tubing 6 stably, avoiding possible leakage.

As shown in FIG. 4, in this embodiment, in order to stably limit a sliding stroke of the sliding sleeve 7, a limiting step 2.1 is convexly disposed at an inner sidewall of the first mounting cavity 2 and a limiting portion 7.1 is disposed at an end of the sliding sleeve 7 close to the gas outlet 002. When the gas discharge orifice 8 has the largest openness, the limiting portion 7.1 and the limiting step 2.1 will be abutted against each other. With such a disposal, there will be a limitation to a limit position for the sliding sleeve 7 to slide toward the gas outlet 002. Therefore, only end-face abutting is required without fixedly connecting both ends of the first pressure regulation spring 10 with the gas inlet connector 5 and the sliding sleeve 7, thereby facilitating mounting.

As shown in FIG. 4, an annular boss 6.1 for sleeving the first pressure regulation spring 10 is disposed at an outer sidewall of the mounting tubing 6. When one end of the first pressure regulation spring 10 is sleeved on the annular boss 6.1, the other end of the first pressure regulation spring 10 is held against a radial middle position of an annular end face of the sliding sleeve 7, thereby improving the stability of the first pressure regulation spring 10. On the other hand, with the position disposal of the first pressure regulation spring 10 and the end face of the sliding sleeve 7, it is ensured that the first pressure regulation spring 10 has a more stable driving force for the sliding sleeve 7, thus ensuring more stable axial slide of the sliding sleeve 7.

As shown in FIG. 4, a sloping surface extending along a gas flow direction (direction indicated by the arrow in the drawing) is disposed at an outer sidewall of an end of the mounting tubing 6 close to the gas outlet 002 and the sloping surface slopes inwardly from the outside of the mounting tubing 6. In this disposal, the portion of the mounting tubing 6 having a large thickness is mainly used to guarantee the structural strength of the mounting tubing 6. The mounting tubing 6 has a minimum thickness at the outermost end of the sloping surface 6.2 and is mainly used to reduce a contact area between the end face of the mounting tubing 6 and the sealing gasket 7. When a pressure in the first mounting cavity 2 increases to a preset value, the sealing gasket 7 can better seal up the end face of the mounting tubing 6, thereby ensuring sealing performance and lowering leakage risk.

Specifically, the regulation process of the level-1 depressurization mechanism is described below.

When no inlet gas pressure is input into the gas inlet connector 5, the sliding sleeve 7 is slid to a limit position toward the gas outlet 002 under the elastic action of the first pressure regulation spring 10, that is, the limiting portion 7.1 and the limiting step 2.1 are abutted against each other. At this time, the gas discharge orifice 8 has the largest openness D1 as shown in FIG. 4.

Figure 5:
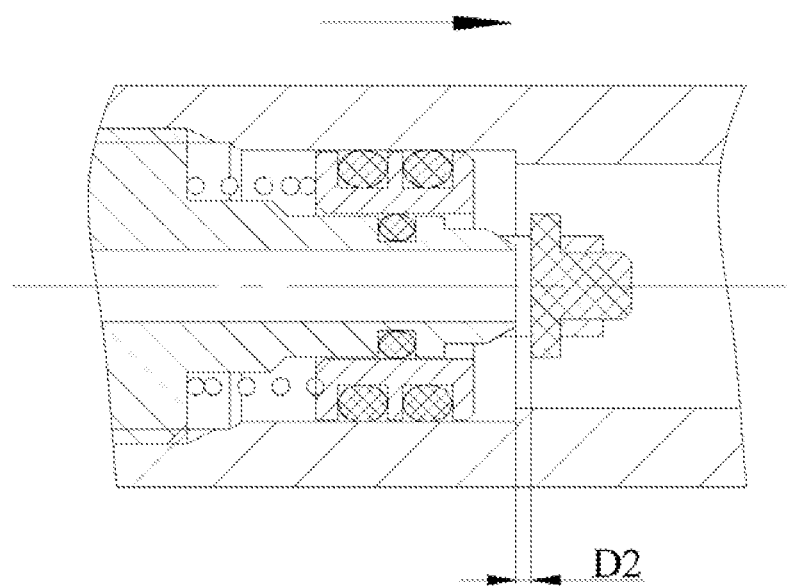
FIG. 5 is a partial sectional diagram of a level-1 depressurization mechanism according to the present invention (valve port is in an adjusted state).

When gas is input into the gas inlet connector 5 and gas is output from the gas outlet 002, the pressure in the first mounting cavity 2 increases. At this time, the sliding sleeve 7 will be slid toward the gas inlet 001 under the action of the pressure, such that the openness of the gas discharge orifice will become smaller to limit a gas input flow. After the gas input flow is reduced, the pressure at the end of the first mounting cavity close to the gas outlet 002 will decrease. At this time, the sliding sleeve 7 will be slid toward the gas outlet 002 again under the action of the first pressure regulation spring 10 such that the gas depressurization regulation function can be realized during the repeated actions of the sliding sleeve 7. After the sliding sleeve 7 is in stable state, the gas will be output at a stable pressure as shown in FIG. 5.

Figure 6:
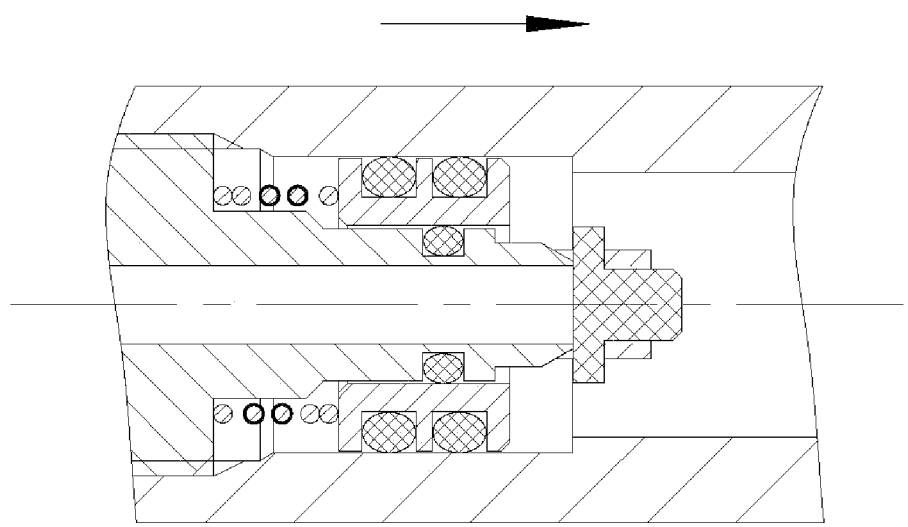
FIG. 6 is a partial sectional diagram of a level-1 depressurization mechanism according to the present invention (valve port is in a closed state).

When gas is input into the gas inlet connector 5 but no gas is output from the gas outlet 002, the pressure in the first mounting cavity 2 will continue increasing. When the pressure reaches a preset pressure, that is, when the pressure can drive the sliding sleeve 7 to slide to the limit position toward the gas inlet connector 5 by overcoming the elastic force of the first pressure regulation spring 10, the sealing gasket 9 is sealingly held against the outer end face of the mounting tubing 6 (a sidewall of an end close to the gas outlet 002) and the openness of the gas discharge orifice 8 is zero, that is, the gas discharge orifice is completely closed as shown in FIG. 6.

As shown in FIGS. 8-13, a level-2 depressurization mechanism structure in this example is provided. Specifically, a level-2 depressurization mechanism 02 comprises a diaphragm assembly, a first supporting point 12, a second supporting point 13 and a second pressure regulation spring 14. The first supporting point 12 is disposed at a position that is at a lower end of a second mounting cavity 3 and close to a valve port 4, and the second supporting point 13 is disposed at a position that is at an upper end of the second mounting cavity 13 and opposite to the first supporting point 12; one end of the diaphragm assembly passes through a passage between the first supporting point 12 and the second supporting point 13 to connect at a sidewall of one end of the second mounting cavity 3, and the other end of the diaphragm assembly is connected to a sidewall of the other end of the second mounting cavity 3; the end of the diaphragm assembly close to the valve port 4 may rotate around the first supporting point 12 or the second supporting point 13 to realize the openness adjustment to the valve port 4, and the pressure regulation spring 14 is disposed between the end of the diaphragm assembly away from the valve port 4 and an upper end face of the second mounting cavity 3.

The specific pressure regulation process of the level-2 depressurization mechanism is described below.

Figure 8:
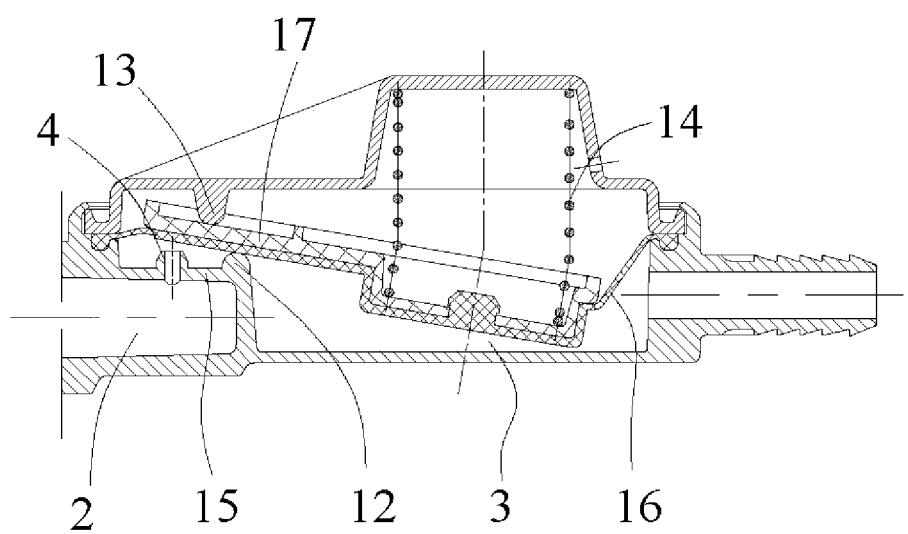
FIG. 8 is a sectional view of a level-2 depressurization mechanism according to the present invention (valve port is in a fully-opened state).

When there is no inlet gas pressure at the valve port 4, the second pressure regulation spring 14 is used to drive an end of the diaphragm assembly away from the valve port 4 to rotate downward around the first supporting point 12, such that an end of the diaphragm assembly close to the valve port 4 runs away from the valve port 4 until the valve port 4 is in the largest openness state, as shown in FIG. 8.

Figure 9:
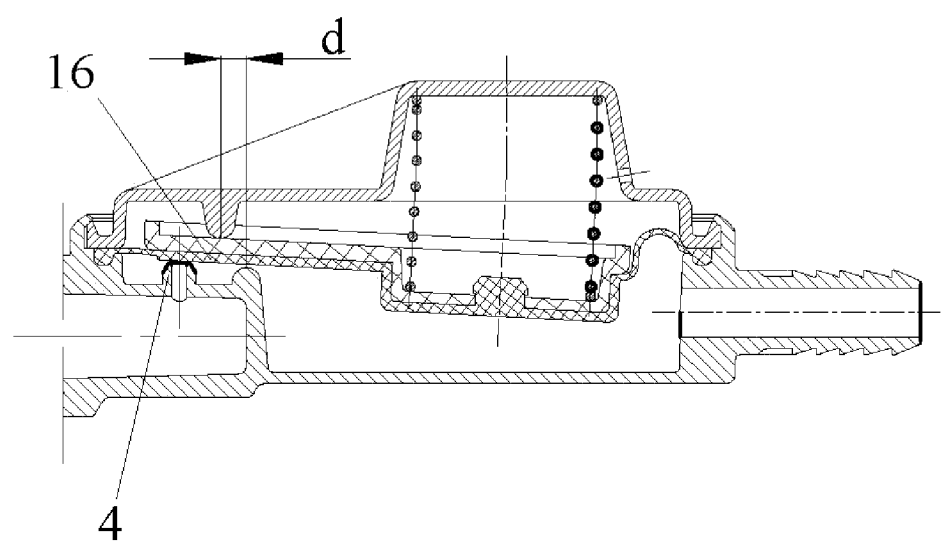
FIG. 9 is a sectional view of a level-2 depressurization mechanism according to the present invention (valve port is in a pressure-adjusted state).

When gas is input into the valve port 4 and gas is output from the gas outlet 002, gas will enter the second mounting cavity 3 through the valve port 4 and the gas pressure in the second mounting cavity 3 increases. But, at this time, the gas pressure in the second mounting cavity 3 is smaller than an elastic force of the second pressure regulation spring 14 and thus is not sufficient enough to push up the entire diaphragm assembly. At this time, the end of the diaphragm assembly away from the valve port 4 rotates upward around the first supporting point 12 such that the end of the diaphragm assembly close to the valve port 4 runs toward the valve port 4 to reduce the openness of the valve port 4, thereby lowering the flow of the gas entering the second mounting cavity 3. When the inlet gas flow continues decreasing, the pressure in the second mounting cavity 3 will decrease along with it. At this time, under the action of the second pressure regulation spring 14, the end of the diaphragm assembly away from the valve port 4 rotates downward around the first supporting point 12 such that the end of the diaphragm assembly close to the valve port 4 runs away from the valve port 4 to gradually increase the openness of the valve port 4. By repeating these reciprocating actions, the gas depressurization function is realized, thereby realizing stable gas output of the gas outlet 002, as shown in FIG. 9.

Figure 10:
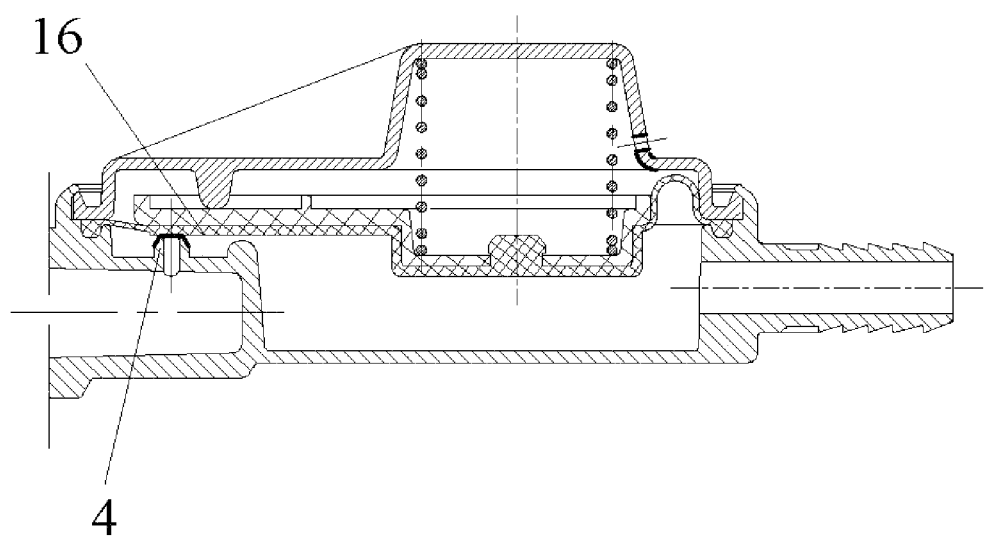
FIG. 10 is a sectional view of a level-2 depressurization mechanism according to the present invention (valve port is in a closed state).

When an inlet gas pressure is input into the valve port 4 and no gas is output from the gas outlet 002, the gas pressure in the second mounting cavity 3 increases to a preset value. At this time, the gas pressure in the second mounting cavity 3 is sufficient to push up the entire diaphragm assembly, and the end of the diaphragm assembly away from the valve port 4 rotates upward around the second supporting point 13, such that the end of the diaphragm assembly close to the valve port 4 runs toward the valve port 4 until the diaphragm assembly fully seals up the upper end face of the valve port 4. At this time, the valve port 4 is in a closed state and the pressure in the second mounting cavity 3 will no longer increase as shown in FIG. 10.

As shown in FIG. 8, a mounting step 15 extending toward the second mounting cavity 3 is disposed at an end of the lower housing 1.2 close to the gas inlet 001, and the valve port 4 is convexly disposed at an upper end face of an end of the mounting step 15 close to the gas inlet 001. Correspondingly, the first supporting point 12 is convexly disposed at an upper end face of the other end of the mounting step 15. Thus, it is guaranteed that the openness of the valve port 4 can be better controlled when the diaphragm assembly rotates around the first supporting point 12.

Furthermore, in this embodiment, the first supporting point 12 and the second supporting point 13 are staggeredly disposed along a gas incoming direction. As shown in FIG. 9, the first supporting point 12 and the second supporting point 13 are not in a same plane vertically, and there is a distance d between the two vertical planes where the first supporting point 12 and the second supporting point 13 are located Further, horizontally, the second supporting point 13 is located between the valve port 4 and the first supporting point 12 along the gas incoming direction.

The staggered disposal of the first supporting point 12 and the second supporting point 13 has the following advantages.

When gas is output from the gas outlet 002, the first supporting point 12 plays a role in rotation of the diaphragm assembly. The relative positions of the first supporting point 12 and the valve port 4 may be adjusted according to flow requirements to increase the openness so as to satisfy the flow output requirements. In this structure, theoretically, when the first supporting point 12 is farther away from the valve port 4, the openness of the valve port 4 will be larger when the end of the diaphragm assembly away from the valve port 4 rotates downward, thus satisfying the flow output requirements better.

When the pressure in the second mounting cavity 3 increases until the valve port 4 is closed, the second supporting point 13 plays a role in rotation of the diaphragm assembly. The relative positions of the second supporting point 13 and the valve port 4 may be adjusted to an optimal lever ratio (theoretically, the closer the second supporting point 13 is to the valve port 4, the lower a closing pressure is) to control a closing pressure as low as possible. In this case, when the gas flow and the closing pressure have some redundancy after satisfying requirements, the housing size can be minimized to achieve reduction of costs in materials and other aspects.

Figure 11:
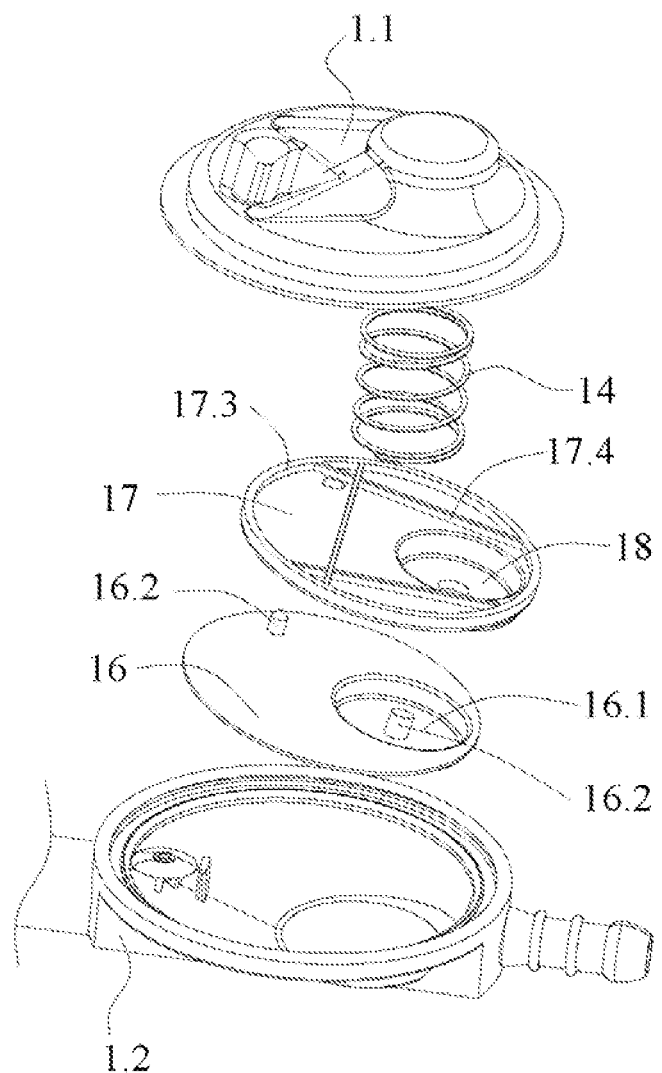
FIG. 11 is an exploded view of a level-2 depressurization mechanism according to the present invention.
Figure 12:
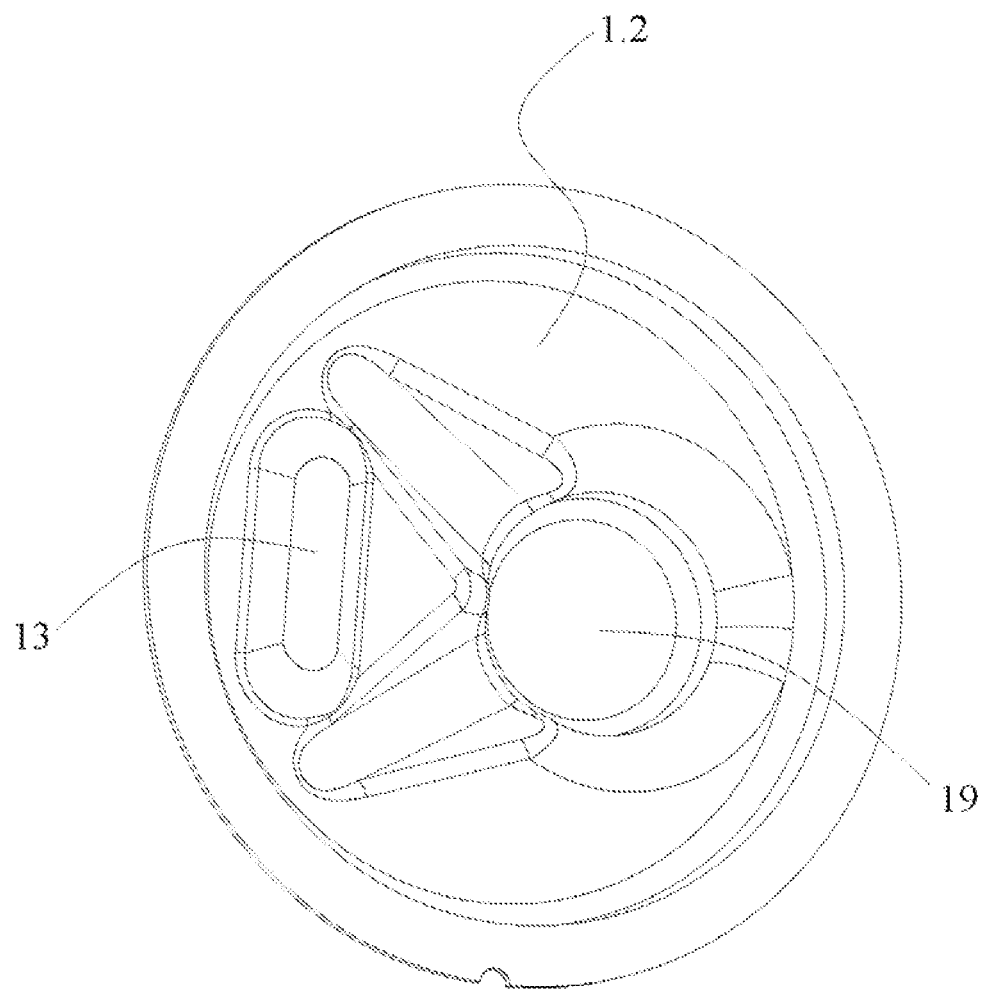
FIG. 12 is a structural schematic diagram of an upper housing according to the present invention.

In this embodiment, preferably, as shown in FIGS. 8 and 11, the diaphragm assembly comprises a rubber diaphragm 16 and a diaphragm cushion 17. The diaphragm cushion 17 is covered on the top of the rubber diaphragm 16; an area of the diaphragm cushion 17 is smaller than that of the rubber diaphragm 16, and the circumferential outer edge of the rubber diaphragm 16 is connected to a sidewall of the second mounting cavity 3. Specifically, the circumferential outer edge of the rubber diaphragm 16 is pressed between the outer edges of the upper housing 1.1 and the lower housing 1.2.

Figure 13:
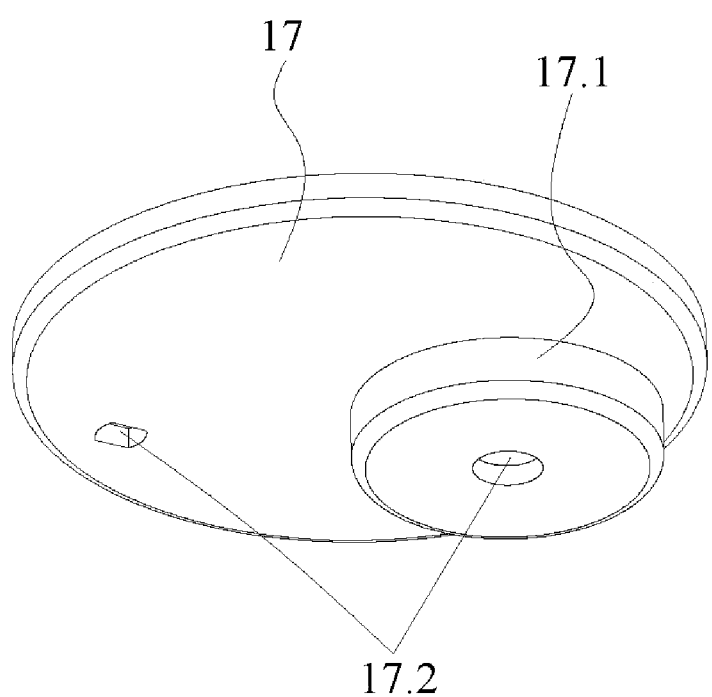
FIG. 13 is a structural schematic diagram of a diaphragm cushion according to the present invention.

As shown in FIGS. 11 and 13, a limiting boss 17.1 is convexly disposed at a lower surface of an end of the diaphragm cushion 17 close to the gas outlet 002 and a limiting groove 16.1 mated with the limiting boss 17.1 is disposed on the rubber diaphragm. At least one locating assembly is disposed between the rubber diaphragm and the diaphragm cushion. Specifically, the locating assembly comprises a locating column 16.2 integrally formed on the rubber diaphragm 16, and a locating hole 17.2 mated with the locating column 16.2 is disposed on the diaphragm cushion 17, as shown in FIG. 11.

On the other hand, a first locating groove 18 is formed by recessing a side of the limiting boss 17.1 away from the rubber diaphragm 16, and a second locating groove 19 corresponding to the first locating groove 18 is disposed on an inner sidewall of the upper housing 1, and both ends of the second pressure regulation spring are fitted into the first locating groove and the second locating grove respectively. In this case, both ends of the second pressure regulation spring 14 are fitted into the first locating groove 18 and the second locating groove 19 respectively, such that installation of the second pressure regulation spring 14 are more stable. In other embodiments, the second pressure regulation spring 14 may also be a rubber corrugated pipe or elastic plate.

In the above structure, the end of the diaphragm cushion 17 close to the gas outlet 002 is sunken downwardly to form the first locating groove 18. At this time, the outer sidewall of the sunken first locating groove 18 forms the limiting boss 17.1. As a result, in this structure, the body of the diaphragm cushion 17, the first locating groove 18 and the limiting boss 17.1 may be integrally formed. The diaphragm cushion 17 in this structure may be made of metal material, or may be made of high strength plastic material. When the plastic material is adopted, one-time injection molding may be employed directly. Therefore, the batch production can be carried out easily at lower costs.

Furthermore, because the entire thickness of the diaphragm cushion 17 is small, in order to ensure the structural strength of the diaphragm cushion 17, the circumferential outer edge of a side of the diaphragm cushion 17 away from the rubber diaphragm 16 is folded up to form an annular retaining rim 17.3 and a reinforcing protrusion rib 17.4 is disposed in the retaining rim 17.3 on the diaphragm cushion 17. As shown in FIG. 11, a plurality of reinforcing protrusion ribs 17.4 crossed mutually are convexly disposed at an inner wall of the retaining rim 17.3, thus effectively ensuring the bottom strength of the diaphragm cushion 17.

The above descriptions are made to the preferred embodiments of the present invention but are not intended to limit the claims. The present invention is not limited to the above embodiments and the specific structures are allowed to change. Various changes made within the scope of protection claimed by the independent claims of the present invention shall all fall within the scope of protection of the present invention.

We claim:

1. A gas pressure regulating device, comprising a housing (1), wherein the housing comprises two ends, a gas inlet (001) and a gas outlet (002) are disposed on the housing (1) respectively, a first mounting cavity (2) in communication with the gas inlet (001) is disposed at an end of the housing (1) and a level-1 depressurization mechanism (01) is disposed in the first mounting cavity (2); a second mounting cavity (3) in communication with the gas outlet (002) is disposed at the other end of the housing (1), wherein the second mounting cavity comprises an upper end and a lower end, the first mounting cavity (2) is in communication with the second mounting cavity (3) through a valve port (4), and a level-2 depressurization mechanism (02) is disposed in the second mounting cavity (3) to control the openness of a valve port (4); the level-1 depressurization mechanism (01) comprises a sliding sleeve (7), wherein the sliding sleeve comprises two ends, a gas inlet connector (5) is disposed at the gas inlet end of the housing (1), an end of the gas inlet connector (5) extends into the first mounting cavity (2) to form a mounting tubing (6), and the sliding sleeve (7) is slidably assembled between an outer wall of the mounting tubing (6) and an inner wall of the first mounting cavity (2); an end of the sliding sleeve (7) is slidably sleeved around the mounting tube (6), and a driving component for driving the sliding sleeve (7) to slide toward the gas outlet (002) is disposed in the first mounting cavity (2); the other end of the sliding sleeve (7) is provided with a gas discharge orifice (8) and a sealing gasket (9), and the gas inlet connector (5) is in communication with the first mounting cavity (2) through the gas discharge orifice (8); when the driving component drives the sliding sleeve (7) to slide to a set position toward the gas outlet (002), the gas discharge orifice (8) has the maximum openness; after a pressure inside the first mounting cavity (2) increases, the sliding sleeve (7) slides toward the gas inlet connector (5), and the gas discharge orifice (8) has a smaller openness, and when the sliding sleeve (7) moves toward the gas inlet connector (5) until the sealing gasket (9) is pressed on an end face of the gas inlet connector (5), the gas discharge orifice (8) is closed;

wherein the level-2 depressurization mechanism (02) comprises a diaphragm assembly, a first supporting point (12), a second supporting point (13) and a second pressure regulation spring (14); the first supporting point (12) is disposed at a position that is on the lower end of the second mounting cavity (3) and adjacent to the valve port (4), and the second supporting point (13) is disposed at a position that is on the upper end of the second mounting cavity (3) and opposite to the first supporting point (12); one end of the diaphragm assembly passes through a passage between the first supporting point (12) and the second supporting point (13) to connect at a sidewall of one end of the second mounting cavity (3), and the other end of the diaphragm assembly is connected to a sidewall of the other end of the second mounting cavity (3); the end of the diaphragm assembly adjacent to the valve port (4) rotate around the first supporting point (12) or the second supporting point (13) to realize the openness adjustment to the valve port (4), and the second pressure regulation spring (14) is disposed between the end of the diaphragm assembly away from the valve port (4) and the upper end face of the second mounting cavity (3);

wherein a mounting step (15) is disposed at an end of the lower end of the second mounting cavity (2) adjacent to the gas inlet (001) and the valve port (4) is disposed convexly at one end of the mounting step (15) adjacent to the gas inlet (001), and the first supporting point (12) is convexly disposed at the other end of the mounting step (15).

2. The gas pressure regulating device of claim 1, wherein the driving component is a first pressure regulation spring (10), and both ends of the first pressure regulation spring

(10) are connected with the gas inlet connector (5) and the sliding sleeve (7) respectively; a sealing ring (11) is disposed between an outer wall of the mounting tubing (6) and an inner wall of the sliding sleeve (7) and between an outer wall of the sliding sleeve (7) and an inner wall of the first mounting cavity (2) respectively.

3. The gas pressure regulating device of claim 1, wherein a limiting step (2.1) is convexly disposed at an inner sidewall of the first mounting cavity (2), and a limiting portion (7.1) is disposed at an end of the sliding sleeve (7) adjacent to the gas outlet (002); when the gas discharge orifice (8) has the largest openness, the limiting portion (7.1) and the limiting step (2.1) are abutted against each other.

4. The gas pressure regulating device of claim 2, wherein an annular boss (6.1) for sleeving the first pressure regulation spring (10) is disposed at an outer sidewall of the mounting tubing (6); when one end of the first pressure regulation spring (10) is sleeved on the annular boss (6.1), the other end of the first pressure regulation spring (10) is held against a radial middle position of an annular end face of the sliding sleeve (7).

5. The gas pressure regulating device of claim 1, wherein a cross section of the sealing gasket (9) is shaped like "T", and a mounting hole (7.2) is disposed at a sidewall of the end of the sliding sleeve (7) adjacent to the gas outlet (002); one end of the sealing gasket (9) is parallel to an gas outlet end face of the gas inlet connector (5), and the other end of the sealing gasket (9) is cooperatively inserted into the mounting hole (7.2).

6. The gas pressure regulating device of claim 1, wherein the first supporting point (12) and the second supporting point (13) are staggeredly disposed along a gas incoming direction, and the second supporting point (13) is located between the valve port (4) and the first supporting point (12) along the gas incoming direction.

7. The gas pressure regulating device of claim 1, wherein the diaphragm assembly comprises a rubber diaphragm (16) and a diaphragm cushion (17); the diaphragm cushion (17) is covered on the top of the rubber diaphragm (16); an area of the diaphragm cushion (17) is smaller than an area of the rubber diaphragm (16), and a circumferential outer edge of the rubber diaphragm (16) is connected to the sidewall of the second mounting cavity (3).

8. The gas pressure regulating device of claim 7, wherein the diaphragm cushion (17) comprises two ends and a lower surface on one end, a limiting boss (17.1) is convexly disposed at the lower surface of the diaphragm cushion (17) adjacent to the gas outlet (002) and a limiting groove (16.1) mated with the limiting boss (17.1) is disposed on the rubber diaphragm (16), and at least one locating assembly is disposed between the rubber diaphragm (16) and the diaphragm cushion (17).

9. The gas pressure regulating device of claim 8, wherein the locating assembly comprises a locating column (16.2) integrally formed on the rubber diaphragm (16), and a locating hole (17.2) mated with the locating column (16.2) is disposed on the diaphragm cushion (17).

10. The gas pressure regulating device of claim 7, wherein the circumferential outer edge of a side of the diaphragm cushion (17) away from the rubber diaphragm (16) is folded up to form a retaining rim (17.3) and a reinforcing protrusion rib (17.4) is disposed inside the retaining rim (17.3) on the diaphragm cushion (17).

11. The gas pressure regulating device of claim 8, wherein a first locating groove (18) is formed by recessing a side of the limiting boss (17.1) away from the rubber diaphragm (16), a second locating groove (19) corresponding to the first locating groove (18) is disposed on the upper end face of the second mounting cavity (3), and both ends of the second pressure regulation spring (14) are fitted into the first locating groove (18) and the second locating grove (19) respectively.

* * * * *